United States Patent [19]
Lengel

[11] 3,734,450
[45] May 22, 1973

[54] FORM FOR MOLDING A BORE IN CONCRETE

[76] Inventor: George W. Lengel, RFD No. 1, Pine Grove, Pa. 17963

[22] Filed: Oct. 28, 1971

[21] Appl. No.: 193,271

[52] U.S. Cl..................249/146, 72/393, 249/12, 249/84, 249/178
[51] Int. Cl..................................B22c 9/24
[58] Field of Search..................249/144, 142, 145, 249/146, 147, 150, 151, 152, 153, 176, 184, 186, 10, 11, 12, 96, 84, 89, 178, 180; 72/393

[56] References Cited

UNITED STATES PATENTS

| 752,249 | 2/1904 | Nickerson | 249/152 X |
| 821,824 | 5/1906 | Kershner et al. | 249/184 |
| 958,402 | 5/1910 | Jackman | 249/11 X |
| 1,029,024 | 6/1912 | Murray | 249/12 |

*Primary Examiner*—J. Spencer Overholser
*Assistant Examiner*—DeWalden W. Jones
*Attorney*—John N. Randolph

[57] ABSTRACT

An expansible cylindrical form for mounting partially in the end of a pipe or conduit and supported thereby. An expander, detachably mounted in the form, maintains the form distended and thereby clamped to the pipe while concrete is poured around said pipe end and the part of the form projecting therefrom, to form a bore in the concrete, when set, constituting a continuation of the pipe bore. The form is composed of staves which can be detached readily from one another and from the pipe bore and the concrete bore after removal of the expander. The exposed ends of the staves can be cut off at a desired angle relative to the axis of the pipe to abut flush against an inner mold wall, the plane of which is not at a right angle to the pipe axis.

4 Claims, 8 Drawing Figures

PATENTED MAY 22 1973 3,734,450

INVENTOR
GEORGE W. LENGEL

BY John N. Randolph

ATTORNEY

INVENTOR
GEORGE W. LENGEL
BY John N. Randolph
ATTORNEY

FORM FOR MOLDING A BORE IN CONCRETE

SUMMARY

It is a primary object of the present invention to provide a form especially adapted for use in molding a bore in a wall of a concrete inlet box of a highway drainage system, for example, and so that said bore will form a continuation of a pipe or conduit bore which is not disposed perpendicular to said wall.

Another object of the invention is to provide a form which is so constructed that it can be attached readily to and clamped in the end of a pipe or conduit from which the form is intended to project, to produce a continuation of the conduit bore when concrete is poured and allowed to set around said pipe end and the part of the form which protrudes therefrom.

A further object of the invention is to provide a form which is capable of being readily removed from the pipe end and the set concrete.

Still another object of the invention is to provide a form which includes a novel expander for maintaining an expansible cylinder distended until the concrete is set around the exposed part thereof and which may thereafter be retracted for removal from the cylinder and to permit the removal of the cylinder from the the conduit and set concrete.

Still a further object of the invention is to provide a form having an expansible cylinder formed of staves the exposed ends of which may be cut off after the cylinder has been clamped in a conduit end, so that the end of the form as defined by the cut off stave ends will abut flush against a mold wall the plane of which is not perpendicular to the conduit axis.

Various other objects and advantages of the invention will hereinafter become more fully apparent from the following description of the drawings, illustrating a presently preferred embodiment thereof, and wherein:

DESCRIPTION OF THE PREFERRED EMBODIMENT

Referring more specifically to the drawings, the form for molding a bore in concrete is designated generally 10 and comprises an expansible cylinder, designated generally 11, and an expander, designated generally 12.

Figure 2:
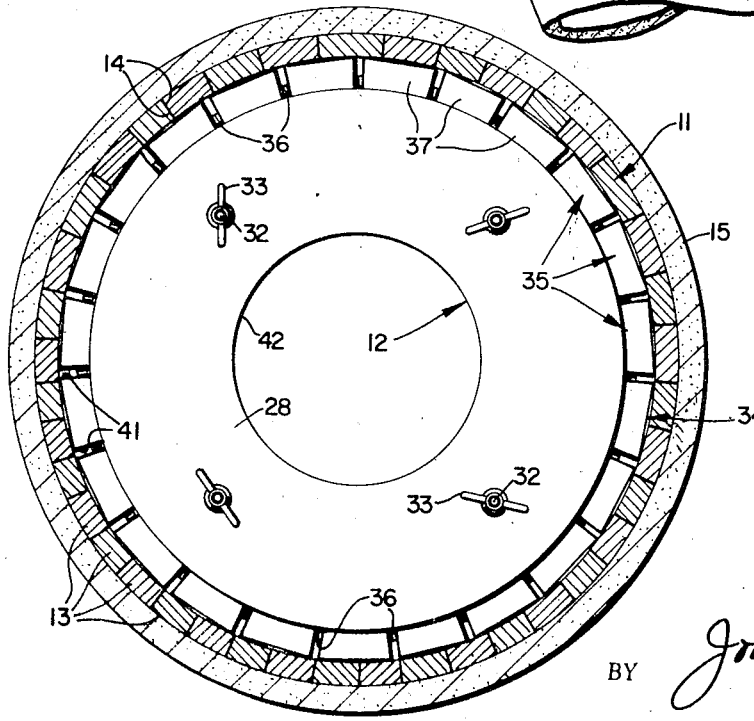
FIG. 2 is an enlarged cross sectional view taken substantially along a plane as indicated by the line 2—2 of FIG. 1.

The cylinder 11 is composed of a plurality of staves 13 the side edges 14 of which may be inclined slightly so as to substantially abut the side edges of adjacent staves when arranged to form a cylinder, as seen in FIG. 2. A part of the cylinder 11 is shown in FIG. 2 lining an end of a pipe or conduit 15, and the expander 12 is shown disposed within the part of the cylinder 11 which is in engagement with the bore of the pipe 15, expanded for clamping the form 10 within the conduit, and with the other end of the cylinder 11 protruding from the conduit end 16.

Figure 1:
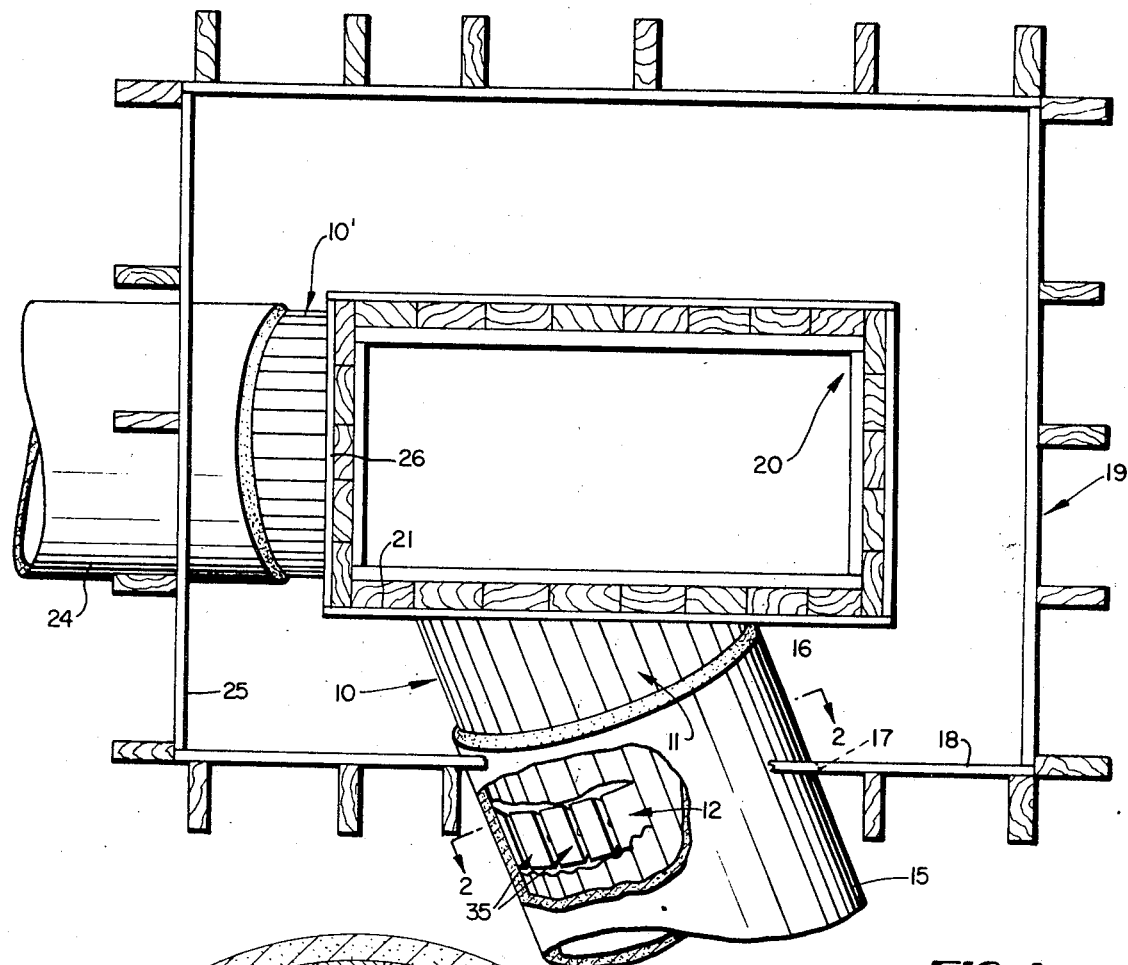
FIG. 1 is a fragmentary top plan view, partially in horizontal section and partially broken away, illustrating one preferred application and use of the form.

FIG. 1 shows said end portion of the conduit 15 extending through an opening 17 of a wall 18 of an outer mold section 19. The mold section 19 surrounds an inner mold section 20 having a wall 21 disposed adjacent and parallel to the wall 18. However, as seen in FIG. 1, the axis of the conduit 15 is not disposed perpendicular to the planes of the walls 18 and 21, and the conduit end 16, which is disposed between said walls, is not located parallel thereto. After the outer mold section 19 has been erected and the opening 17 has been provided so that the conduit 15 can be positioned to extend through said opening, as illustrated in FIG. 1, the staves 13 may be applied to said conduit end and the expander 12 applied to the cylinder 11, formed by the staves, and expanded for clamping the form in the conduit 15 and with a part of the cylinder 11 protruding from the conduit end 16. The staves 13 are formed of wood so that said protruding ends can be cut off at a desired angle to abut flush against the wall 21, when the inner mold section 20 is erected within the outer mold section 19, as illustrated in FIG. 1.

Concrete, not shown, is then poured in the rectangular space between the mold sections 19 and 20. When the concrete is set, the inner mold section 20 is removed after which the expander 12 can be retracted and removed through the end of the form 10, defined by the cut-off stave ends. The individual staves 13 are then removed inwardly through the open center of the inlet box 22, formed by removal of the inner mold section 20. The outer mold section 19 is then removed. As is conventional, the inlet box 22 is closed at its bottom and has a grill or grating 23 over the open top thereof.

FIG. 1 also illustrates an end of a second conduit 24 which extends through another wall 25 of the outer mold section 19 and which has another form 10' secured in and protruding from said conduit end and abutting flush against a wall 26 of the inner mold section 20. The second form 10' is required because the conduit 24 is disposed at an incline and its axis is therefor not normal to the plane of the wall 26.

Figure 4:
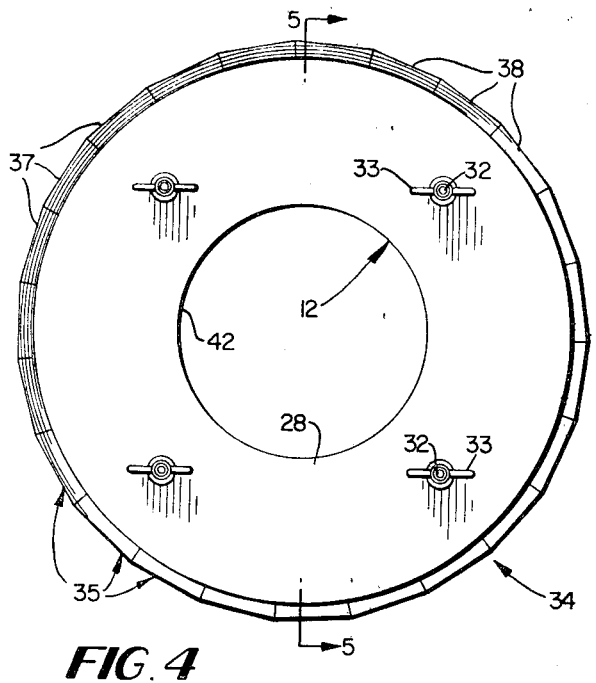
FIG. 4 is an enlarged side elevational view of the expander.
Figure 5:
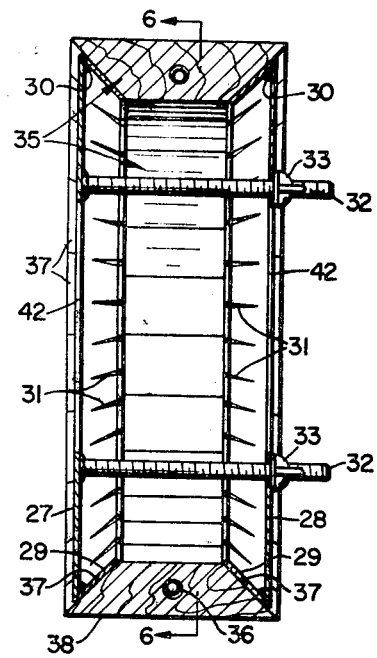
FIG. 5 is a sectional view thereof taken substantially along a plane as indicated by the line 5—5 of FIG. 4.

FIGS. 4 to 8 provide a further illustration of the expander 12 which includes corresponding substantially parallel discs 27 and 28 each having a downwardly and inwardly extending flange 29 at the periphery thereof, which may be formed integral therewith, or secured thereto, as by welding, as seen at 30 in FIG. 5. The flanges 29 are disposed at approximately 45° angles to the planes of the discs 27 and 28 and each is provided with spaced apart outwardly extending V-shaped notches 31. Discs 27 and 28 may have central openings 42.

Threaded rods 32 are secured to project from the inner side of the disc 27 slidably through the disc 28. Wing nuts 33 threadedly engage the rods 32 and bear against the outer side of the disc 28, for connecting said discs together in spaced apart, substantially parallel relation to one another.

Figure 7:
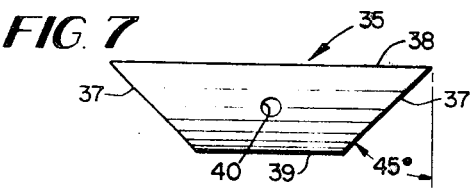
FIG. 7 is a side elevational view of one part of the expander.
Figure 8:
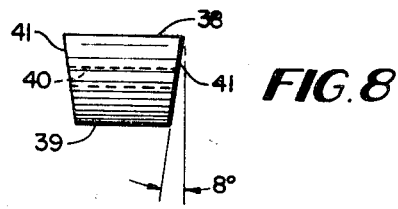
FIG. 8 is an end elevational view thereof.

The expander 12 also includes a rim, designated generally 34, composed of a plurality of corresponding blocks 35 and a contractile coil spring 36. As seen in FIg. 7, each block 35 has ends 37 which are inclined downwardly and inwardly from an upper outer face 38 thereof to an inner face 39 of said block at an angle of approximately 45°, which corresponds with the angles of the flanges 29. Each block 35 has an opening 40 extending crosswise through the center thereof. As seen in FIG. 8, the corresponding sides 41 of each block 35 are likewise tapered slightly from the outer face 38 to the inner face 39, usually about 8°, so as to form angles of 82° with the outer side 38.

Figure 6:
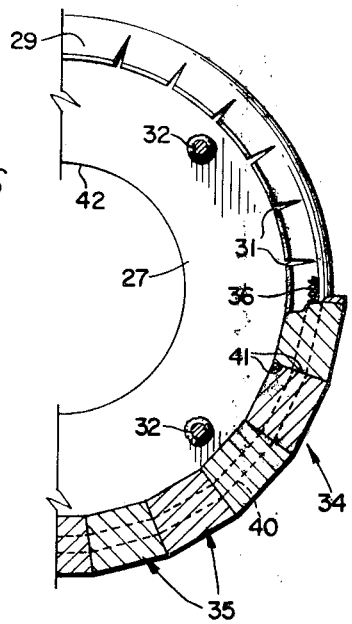
FIG. 6 is a fragmentary sectional view, partly broken away, taken substantially along a plane as indicated by the line 6—6 of FIG. 5.
Figure 3:
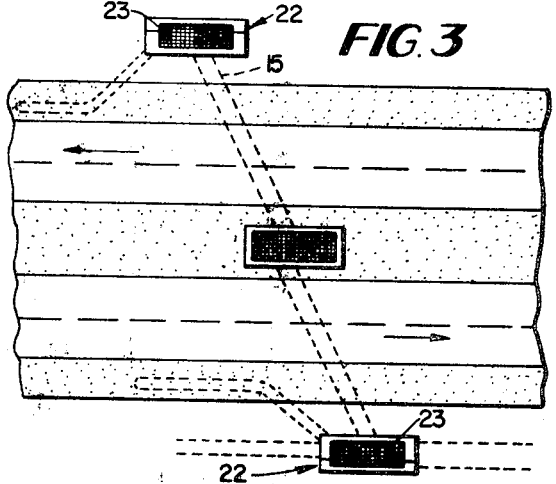
FIG. 3 is a fragmentary plan view, on a greatly reduced scale, illustrating a part of a highway drainage system including concrete inlet boxes, in connection with the fabrication of which, the form, constituting the present invention is utilized.

The blocks 35 are disposed crosswise of the discs 27 and 28 with their ends 37 abutting flush against the flanges 29, as seen in FIG. 5. The spring 36 extends through all of the openings 40 and has its ends connected. Said spring is disposed under tension for normally drawing the blocks 35 inwardly of one another, so that the sides 41 thereof will be disposed in abutting engagement with one another, as seen in FIGS. 4 and 6, before tightening the nuts 33 and while applying the expander 12 to the cylinder 11 and for removing it therefrom. After application of the expander 12 to the cylinder 11, with the disc 28 facing toward the exposed ends of the staves 13, as seen in FIG. 2, the nuts 33 are tightened for drawing the discs 27 and 28 toward one another to cause the flanges 29 to cam the blocks 35 outwardly from their retracted positions of FIGS. 4, 5 and 6 to their extended positions of FIG. 2, into clamping engagement with the staves 13, as heretofore described. When it is desired to remove the form 10 from the conduit 15, the nuts 33 are loosened to allow the spring 36 to draw the blocks 35 back to their positions of FIGS. 4, 5 and 6, while at the same time displacing the discs 27 and 28 away from one another, so that the expander 12 can be removed as a unit from the cylinder 11 after which said cylinder can be dismantled and removed, as heretofore described.

Various modifications and changes are contemplated and may be resorted to, without departing from the function or scope of the invention.

I claim as my invention:

1. A form for molding a bore in concrete comprising an expansible cylinder partially disposed in and projecting from an end of a pipe or conduit, and an expander detachably mounted in the cylinder for maintaining the cylinder distended and clamped to the pipe or conduit to be supported thereby while concrete is poured and allowed to set around said pipe end and the exposed portion of the cylinder to form a bore in the set concrete, constituting a continuation of the conduit bore when the form is removed from the conduit and concrete, said expander being ring-shaped and having a periphery or rim abutting against the inner surface of the expansible cylinder and including spaced apart substantially parallel discs having inwardly extending annular cam surfaces at the peripheries thereof, said rim comprising a plurality of blocks disposed crosswise of the cam surfaces and having inclined end portions abutting thereagainst, and means for drawing the discs together for camming the blocks outwardly thereof to enlarge the rim for distending the cylinder.

2. A form as in claim 1, said last mentioned means comprising threaded rods anchored to and projecting from an inner side of one of said discs slidably through the other disc, and nuts threadedly engaging said rods for drawing the discs together when the nuts are turned in one direction.

3. A form as in claim 2, and means for drawing the blocks inwardly of one another to contract the expander when the nuts are turned in the opposite direction.

4. A form as in claim 3, said last mentioned means comprising an endless contractile coil spring extending transversely through and slidably disposed in each of the blocks for connecting the blocks and for urging the blocks inwardly of one another.

* * * * *